(12) United States Patent
Suzuki et al.

(10) Patent No.: US 8,452,488 B2
(45) Date of Patent: May 28, 2013

(54) MEMORY READOUT SYSTEM FOR VEHICLE CONTROL DEVICE

(75) Inventors: Tatsuya Suzuki, Kariya (JP); Tadatoshi Asada, Anjo (JP); Kunihiro Abe, Higashimurayama (JP)

(73) Assignee: Denso Corporation, Kariya (JP)

( * ) Notice: Subject to any disclaimer, the term of this patent is extended or adjusted under 35 U.S.C. 154(b) by 1231 days.

(21) Appl. No.: 12/076,505

(22) Filed: Mar. 19, 2008

(65) Prior Publication Data

US 2008/0234892 A1    Sep. 25, 2008

(30) Foreign Application Priority Data

Mar. 22, 2007  (JP) .................................. 2007-073885

(51) Int. Cl.
*B60R 25/00*       (2006.01)
(52) U.S. Cl.
USPC .......... 701/36; 701/29.1; 701/32.6; 701/33.2; 340/426.1; 340/438
(58) Field of Classification Search
CPC ..................................................... B60R 25/00
USPC ................ 701/117, 468, 505, 115, 118, 122, 701/300, 33.3, 33.4, 33.6, 466, 484, 498, 701/527, 64; 340/438, 461, 439, 457, 815.55, 340/988, 994, 10.41, 435, 436, 447, 448, 340/449, 457.4, 459, 539.1, 568.7, 571, 585, 340/595, 5.7, 636.11, 636.12, 636.15, 669, 340/870.06, 870.13, 870.31, 901, 903, 905, 340/934, 936, 937, 971, 977, 978, 991
See application file for complete search history.

(56) References Cited

U.S. PATENT DOCUMENTS

| | | | |
|---|---|---|---|
| 5,430,675 A | | 7/1995 | Yajima et al. |
| 7,132,923 B2 * | | 11/2006 | Yashiki et al. ................ 340/5.21 |
| 2002/0002430 A1 * | | 1/2002 | Nada ................................ 701/35 |

FOREIGN PATENT DOCUMENTS

| | | |
|---|---|---|
| CN | 1095864 A | 11/1994 |
| CN | 1321931 A | 11/2001 |
| DE | 198 12 318 A1 | 9/1999 |
| DE | 198 36 126 A1 | 2/2000 |
| DE | 100 14 994 A1 | 10/2000 |
| DE | 100 15 318 A1 | 11/2000 |
| JP | A-9-123876 | 5/1997 |
| JP | A 2001-265582 | 9/2001 |
| JP | A-2003-104137 | 4/2003 |

OTHER PUBLICATIONS

Japanese Office Action issued Feb. 17, 2009.

(Continued)

*Primary Examiner* — Thomas Tarcza
*Assistant Examiner* — Adam Tissot
(74) *Attorney, Agent, or Firm* — Oliff & Berridge, PLC

(57) ABSTRACT

A memory readout system comprised of a vehicle control device and a readout device to be detachably connected to the vehicle control device. The readout device reads out dialogue information stored in a built-in nonvolatile memory in the vehicle control device when connected to the vehicle control device and a predetermined certification condition is satisfied. The vehicle control device is comprised of the built-in nonvolatile memory and a dialogue information readout unit. In particular, the nonvolatile memory has a un-rewritable area which allows a dialogue information writing, but inhibits a dialogue information deletion. The dialogue information readout unit reads out the dialogue information stored in the un-rewritable area when a password certification judges that the readout device is an authorized one, and then transfers the dialogue information to the readout device.

11 Claims, 5 Drawing Sheets

OTHER PUBLICATIONS

Nov. 13, 2012 Office Action issued in German Patent Application No. 10 2008 014 922.5-34; with English-language translation.

Chinese Office Action issued in Chinese Patent Application No. 200810085180.2 on Jul. 17, 2009 with translation.

* cited by examiner

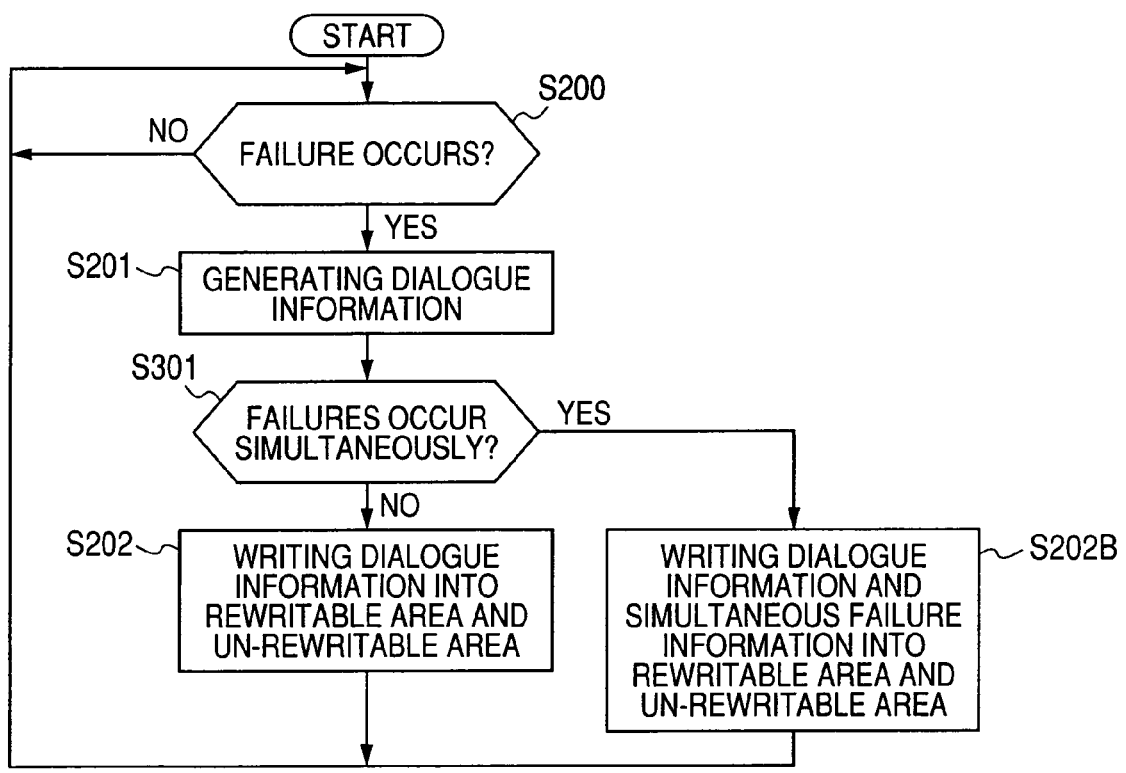

MEMORY READOUT SYSTEM FOR VEHICLE CONTROL DEVICE

CROSS-REFERENCE TO RELATED APPLICATION

This application is related to and claims priority from Japanese Patent Application No. 2007-73885 filed on Mar. 22, 2007, the contents of which are hereby incorporated by reference.

BACKGROUND OF THE INVENTION

1. Field of the Invention

The present invention relates to a memory readout system for a vehicle control device equipped with a built-in nonvolatile memory mounted to motor vehicles such as passenger vehicles and trucks, and in particular, relates to a memory readout system capable of reading out vehicle information and various data stored in a nonvolatile memory.

2. Description of the Related Art

A recent vehicle is equipped with a vehicle control device which is capable of performing an engine control operation and controlling operations of various vehicle devices mounted to a motor vehicle. It can be considered that such a vehicle control device is equipped with a built-in nonvolatile memory. Diagnosis information such as various types of error information (which will be referred to as the "dialogue information" through the specification) and diagnosis information are stored in the built-in nonvolatile memory. The dialogue information is read out from the built-in nonvolatile memory at a vehicle inspection. During a vehicle inspection, if a wrong or erroneous operation deletes the dialogue information stored in the nonvolatile memory, a vehicle manufacturer cannot perform diagnosis and analysis for failure. In order to avoid such an erroneous operation, there are related art techniques such as a memory rewritten system which performs certification using a security function. Such a security function is stored in both the vehicle control device and a rewriting device. The vehicle control device calculates the security function, and the rewriting device also calculate the security function during the inspection work, and an inspector reads/ rewrites information data out/into the built-in nonvolatile memory only when both of the calculation results agreed with each other. This means that a specially authorized or designed rewriting device (namely, a dedicated rewriting device) using a formal security function can allow to read out/rewrite the dialogue information from/into the nonvolatile memory. This can avoid carelessness or unexpected deletion.

However, such related art techniques involves a possibility of deleting the important dialogue information by wrong or erroneous operations under a condition where the specially designed rewriting device is equipped with such a built-in nonvolatile memory using the formal security function, and it is thereby impossible to completely prevent occurrence of such an erroneous deletion of the dialogue information stored in the nonvolatile memory. In addition, when vehicle manufacturers and dealers want to read out the dialogue information stored in the memory in the vehicle control device, it must be required for each of the vehicle manufacturers and dealers to have a specially designed rewriting device using a formal security function. This requires much labor and time increases the maintenance cost.

SUMMARY OF THE INVENTION

It is an object of the present invention to provide a memory readout system for a vehicle control device, capable of preventing any erroneous deletion of dialogue information stored in a memory which is built in the vehicle control device, and of reading out the dialogue information from the memory without increasing labor, time, or maintenance cost.

To achieve the above purposes, the present invention provides a memory readout system has a vehicle control device and a readout device that is detachably connected to the vehicle control device. The vehicle control device has a nonvolatile memory, a vehicle information write means, and a vehicle information readout means. The non-volatile memory is composed of an un-rewritable area that allows data writing and inhibits data deletion. The vehicle information write means is configured to generate and write vehicle information into the un-rewritable area in the non-volatile memory. The vehicle information readout means is configured to read out the vehicle information stored in the un-rewritable area in the non-volatile memory and to transfer the readout device when the readout device is connected to the vehicle control device. Because the vehicle information is written into the un-rewritable area in the non-volatile memory, it is possible to prevent the occurrence of deleting the vehicle information through carelessness or unexpected deletion.

In the memory readout system as another aspect of the present invention, it is preferable that the non-volatile memory is composed of the un-rewritable area and a rewritable area that allows data writing and deletion, and the vehicle information write means writes the vehicle information into both the un-rewritable area and the rewritable area in the non-volatile memory, and the vehicle information readout means reads out the vehicle information from the un-rewritable area and the rewritable area in the non-volatile memory, and transfers the vehicle information to the readout device. Because the vehicle information stored in the rewritable area in the non-volatile memory can be deleted, it is possible to easily recognize whether or not the failure has occurred again by writing new vehicle failure information into the rewritable memory after of the vehicle information has been deleted.

In the memory readout system as another aspect of the present invention, it is preferable that the vehicle control device further has a certification means configured to perform a predetermined certification for the readout device or an operator who uses the readout device. In the memory readout system, the vehicle information readout means reads out the vehicle information stored in the un-rewritable area when the certification means judges the readout device is an authorized one or the operator is a formal user, and reads out the vehicle information stored in the rewritable area when the certification means judges that the readout device is not the authorized one or the operator is not the formal user. Because the vehicle information can be read out from either the rewritable area or the un-rewritable area according to the certification result, it is possible to read out correct and accurate vehicle information which has not been deleted and rewritten when the formal readout device is used. On the contrary, it is possible to read out the vehicle information stored in the rewritable area without increasing labor or cost when a un-authorized readout device is used.

In the memory readout system as another aspect of the present invention, it is preferable that the vehicle information is failure information which is collected or generated when failure occurs, the vehicle control device further has a counter means configured to count the number of failure occurrences, and the vehicle information write means adds the number of failure occurrences counted by the counter means into the vehicle information to be written in the un-rewritable area in the non-volatile memory. Because an operator can know the number of failure occurrences, it is possible to easily analyze a failure cause based on the vehicle information read out from the non-volatile memory.

In the memory readout system as another aspect of the present invention, it is preferable that the vehicle information is failure information to be collected or generated when a failure occurs in a vehicle, and the vehicle information write means adds simultaneous information, which distinguishes each of failures, which simultaneously occur, from others into the vehicle information. Because an operator can easily know a combination of failures which simultaneously occur, it is possible to easily analyse a failure cause based on the vehicle information read out from the non-volatile memory.

In the memory readout system as another aspect of the present invention, it is preferable that the vehicle information is failure information to be collected or generated when a failure occurs in a vehicle, and the vehicle information write means adds vehicle state information representing a vehicle state when the failure occurs, into the vehicle information. Because an operator can know the vehicle condition when the failure occurs (such as an acceleration state, a deceleration state, and idle state of the vehicle), it is possible to easily analysis a failure cause based on the vehicle information read out from the non-volatile memory.

In the memory readout system as another aspect of the present invention, it is preferable that the vehicle state information includes control state information representing a control state by the vehicle control device. Because an operator can know the control state of the vehicle control device when the failure occurs, it is possible to easily analyze the vehicle information read out from the non-volatile memory.

In the memory readout system as another aspect of the present invention, it is preferable that the vehicle state information includes electric power source state information representing an electric power source condition. Because an operator can know an electric power source condition (for example, whether or not the ignition key is ON or OFF when the failure occurs) based on the electric power source state information, it is possible to easily analyze the vehicle information read out from the non-volatile memory.

In the memory readout system as another aspect of the present invention, it is preferable that the certification means performs certification at every reading of the vehicle-information by the vehicle information readout means. It is thereby possible to avoid performing any special or additional procedure for releasing the vehicle control device from the readout state of the vehicle information stored in the un-rewritable area which is performed after completion of the certification.

In the memory readout system as another aspect of the present invention, it is preferable that the readout device has a password input means which allows the operator to input a special password when the operator performs a predetermined operation, and the certification means initiates the certification of the password which is input through the password input means. It is thereby possible for an authorized operator or person who knows the vehicle information can be read out only after completion of the certification process to input a password, and thereby possible to prevent the execution of readout of the vehicle information stored in the un-rewritable area by operators other than the authorized operator.

In the memory readout system as another aspect of the present invention, it is preferable that the certification means initiates the certification procedure when the vehicle control device detects the establishment of a special condition which is hardly thought of actually happened in an actual vehicle, even though this is a very unlikely case, for example, in a case of a vehicle speed of not less than 300 km/h. It is thereby possible to perform the certification operation only when a special device that makes a specialized condition is connected to the vehicle control device. This can prevent au-authorized certification by an operator which does not know such a specialized condition or does not use such an authorized device.

In the memory readout system as another aspect of the present invention, it is preferable that a readable state, which is initiated by the authorization of the certification means and in which the vehicle information stored in the un-rewritable area is readable, is terminated when a vehicle ignition key is turned OFF. It is further preferable that a readable state, which is initiated by the authorization of the certification means and in which the vehicle information stored in the un-rewritable area is readable, is terminated when the readout device is detached from the vehicle control device. It is thereby possible to avoid any special procedure for releasing the vehicle control device from the state to read out the vehicle information stored in the un-rewritable area which is performed after completion of the certification.

BRIEF DESCRIPTION OF THE DRAWINGS

A preferred, non-limiting embodiment of the present invention will be described by way of example with reference to the accompanying drawings, in which:

FIG. 5 is a flow chart showing another modification example of the operation procedure for generating and writing the dialogue information into the nonvolatile memory which is built in the vehicle control device in the memory readout system shown in FIG. 1.

DETAILED DESCRIPTION OF THE PREFERRED EMBODIMENTS

Figure 1:
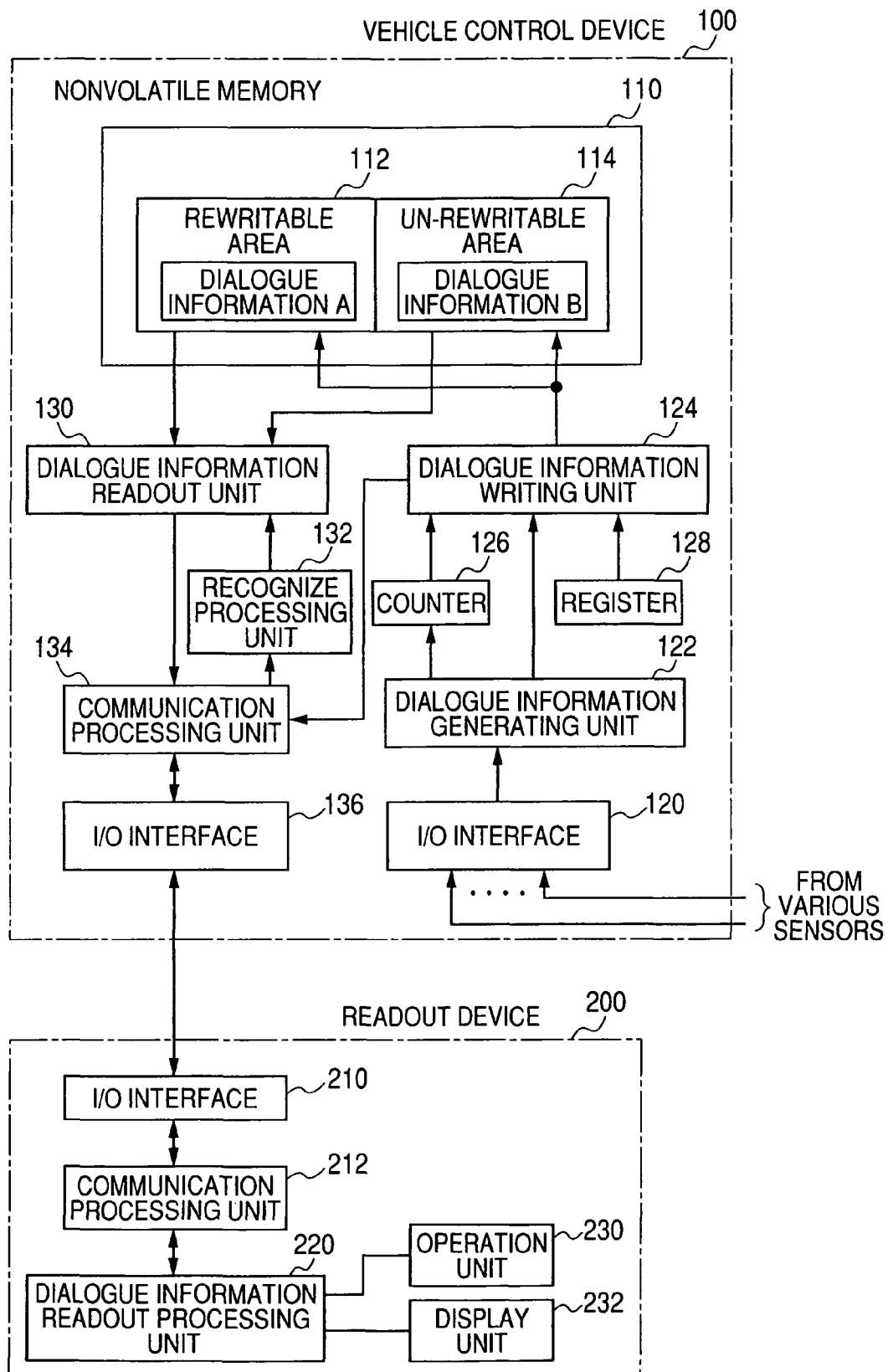
FIG. 1 is a block diagram showing an entire configuration of a memory readout system comprised of a vehicle control device and a readout device according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of an embodiment of a memory readout system for a vehicle control device mounted to a motor vehicle with reference to drawings.

FIG. 1 is a block diagram showing an entire configuration of the memory readout system according to the embodiment of the present invention. The memory readout system according to the embodiment shown in FIG. 1 is comprised of a vehicle control device 100 and a readout device 200.

For example, the vehicle control device 100 generates and transfers an engine speed control instruction to an engine controller, and also generates and transfers various instructions to various auxiliary devices (for example, a vehicle alternator). The vehicle control device 100 is mounted to a motor vehicle. The vehicle control device 100 also generates dialogue information as vehicle information.

The vehicle control device 100 is comprised of a nonvolatile memory 110, input and output (I/O) interfaces 120 and 136, a dialogue information generation unit 122, a dialogue information writing unit 124, a counter 126, a register 128, a dialogue information readout unit 130, a recognition processing unit 132, and a communication processing unit 134. In particular, FIG. 1 shows the configuration of the components relating to the dialogue information in the vehicle control device 100. Other components relating to the intrinsic engine control function are omitted from the configuration of the vehicle control device 100 shown in FIG. 1 for short.

It is possible to realize the dialogue information generation unit 122, the dialogue information writing unit 124, the counter 126, the register 128, the dialogue information readout unit 130, and the recognition processing unit 132 using predetermined programs stored in a ROM or a RAM which are executed by a central processing unit (CPU).

The nonvolatile memory 110 is used in storing dialogue information which is a readout operation target of the readout device 200. The nonvolatile memory 110 is comprised of a rewritable area 112, and an un-rewritable area 114. The rewritable area 112 is a memory area into or from which data items can be written or read out. On the other hand, the un-rewritable area 114 is a memory area which allows a data writing and inhibits a data deletion.

Flash memory and EEPROM are available as the nonvolatile memory 110.

The I/O interface 120 is connected to various types of sensors, and inputs output data from those sensors. The I/O interface 136 is connected to the readout device 200 through a communication line only when data transmission is required between the readout device 200 and the vehicle control device 100.

The dialogue information generation unit 122 are connected to the various types of sensors through the I/O interface 120 and receives detection data transferred from the various types of sensors through the I/O interface 120 when the sensors detect abnormal state of the auxiliary devices and auxiliary device failures. (Hereinafter, abnormal state and device failures will be referred to the "failure" for short.) The dialogue information generation unit 122 further examines or diagnoses whether or not a failure occurs in each auxiliary device. The dialogue information generation unit 122 generates dialogue information based on the diagnosis results of the auxiliary devices. The dialogue information writing unit 124 stores, by writing the dialogue information generated by the dialogue information generation unit 122 into both of the rewritable area 112 and the un-rewritable area 114 in the nonvolatile memory 110.

FIG. 1 shows "dialogue information A" as the dialogue information which is written or stored in the rewritable area 112 by the dialogue information writing unit 124 and shows "dialogue information B" as the dialogue information written or stored in the un-rewritable area 114 by the dialogue information writing unit 124. That is, the "dialogue information A" and the "dialogue information B" are the same data.

The counter 126 is incremented by one when an auxiliary device failure occurs and is generated failure data to be written into the dialogue information. The register 128 stores control state information which indicates a control state performed by the vehicle control device 100. Specifically, the register 128 corresponds to internal registers in the CPU to which control data items are stored.

The dialogue information readout unit 130 reads out one of the dialogue information A stored in the rewritable area 112 and the dialogue information B stored in the un-rewritable area 114 in the nonvolatile memory 110.

The recognition processing unit 132 certifies whether the readout device 200 is authorized one or not and whether a user who operates the readout device 200 or is an authorized operator. For example, when a user inputs a password into the vehicle control device 100, the recognition processing unit 132 performs the certification of the password by checking whether or not the password is correct.

The communication processing unit 134 performs data transfer between the vehicle control device 100 and the readout device 200 through the I/O interface 136 based on predetermined communication protocols.

The readout device 200 is connected to the vehicle control device 100 in order to read out and delete the dialogue information made by the vehicle control device 100 when an operator diagnoses occurrence of the vehicle failure. The readout device 200 is comprised of an input/output (I/O) interface 210, a communication processing unit 212, a dialogue information readout processing unit 220, an operation unit 230, and a display unit 232.

The input/output (I/O) interface 210 in the readout device 200 is connected to the vehicle control device 100 and data transfer is performed between the vehicle control device 100 and the readout device 200 through a communication line when needed. The data transfer is performed based on a predetermined communication protocol through the I/O interface 210 and the I/O interface 136. The dialogue information readout processing unit 220 transfers a readout command which indicates a readout operation of the dialogue information and a deletion command which indicates a deletion operation of the dialogue information to the vehicle control device 100. The dialogue information readout processing unit 220 receives the dialogue information as a response to the transferred readout command and stores the received dialogue information into a memory (not shown).

The operation unit 230 is equipped with various types of keys and an operator inputs data through the keys. For example, the operator pushes the "Readout key" in order to instruct the readout of the dialogue information from the nonvolatile memory 110 in the vehicle control device 100. If the "Readout key" is pressed for a certain period of time (, for example, several seconds or more), the operator is allowed to enter a password through a ten-key input window on the operation unit 230.

The display unit 232 displays various types of operation windows and a dialogue-information readout progressing window on a display screen. For example, when the operator presses the "Readout key" on the operation unit 230 for a long time, a password input window appears on the display unit 232. In this embodiment of the present invention, the password input window can appear on the display unit 232 only after the operator operates a predetermined procedure. Therefore an operator who does not know the presence of such a password input window does not know how to display the password input window on the display unit 232 and cannot input the password to the readout device 200.

In this embodiment, the operation to press the "Readout key" for a long time enables the password input window to appear on the display unit 232 and the operator to input the password through the password input window, the present invention is not limited by this manner, for example, it is possible to display the password input window only when both the "Readout key" and "another key" are pushed simultaneously, or only when a predetermined operation is performed.

The dialogue information writing unit 124 corresponds to a vehicle information writing means, the dialogue information readout unit 130 corresponds to a vehicle information readout means, the recognition processing unit 132 corresponds to a recognition or certification means, the counter 126 corresponds to a counter means, and the operation unit 230 and the display unit 232 correspond to a password input means. Those means are defined in claims according to the present invention.

A description will now be given of an operation procedure of the memory readout system having the configuration described above.

Figure 2:
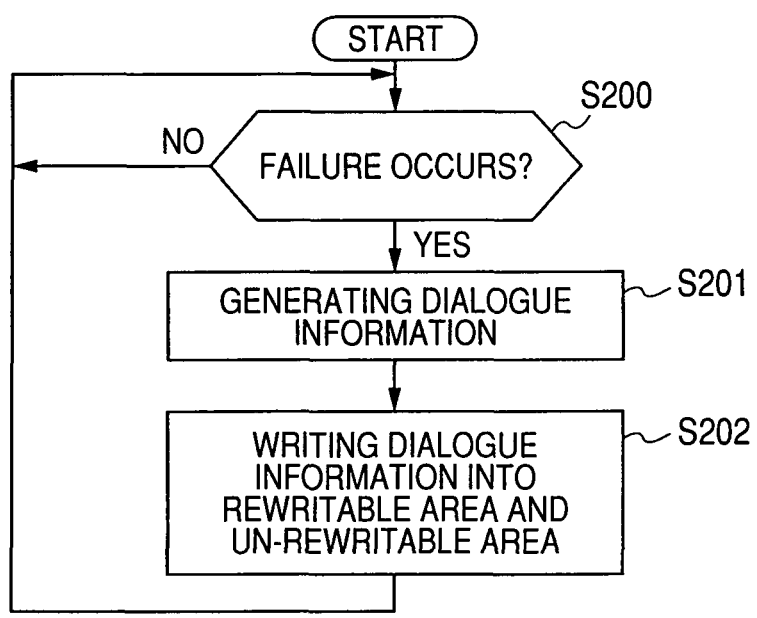
FIG. 2 is a flow chart showing an operation procedure for generating and writing dialogue information into a nonvolatile memory which is built in the vehicle control device in the memory readout system shown in FIG. 1.

FIG. 2 is a flow chart showing the operation procedure for generating and writing dialogue information into the non-volatile memory 110 which is built in the vehicle control device 100 in the memory readout system shown in FIG. 1.

The dialogue information generation unit 122 judges whether or not a failure occurs in the various auxiliary devices or not (step S200). When the judgment result indicates that no failure occurs in the various auxiliary devices, the dialogue information generation unit 122 continuously performs this judgment until the judgment result indicates a failure occurrence in the various auxiliary devices.

When the dialogue information generation unit 122 judges occurrence of a failure in the various auxiliary devices based on output data items transferred from various types of the sensors through the I/O interface 120 (step S200), the operation flow then goes to step S201.

At step S201, the dialogue information generation unit 122 makes, namely, generates dialogue information (step S201).

The dialogue information writing unit 124 writes the dialogue information generated by the dialogue information generation unit 122 into the rewritable area 112 as "dialogue information A", and further writes the same dialogue information into the un-rewritable area 114 as "dialogue information B" (step S202). The dialogue information generated when the failure occurs is written into both the rewritable area 112 and the un-rewritable area 114 in the nonvolatile memory 110.

Figure 3:
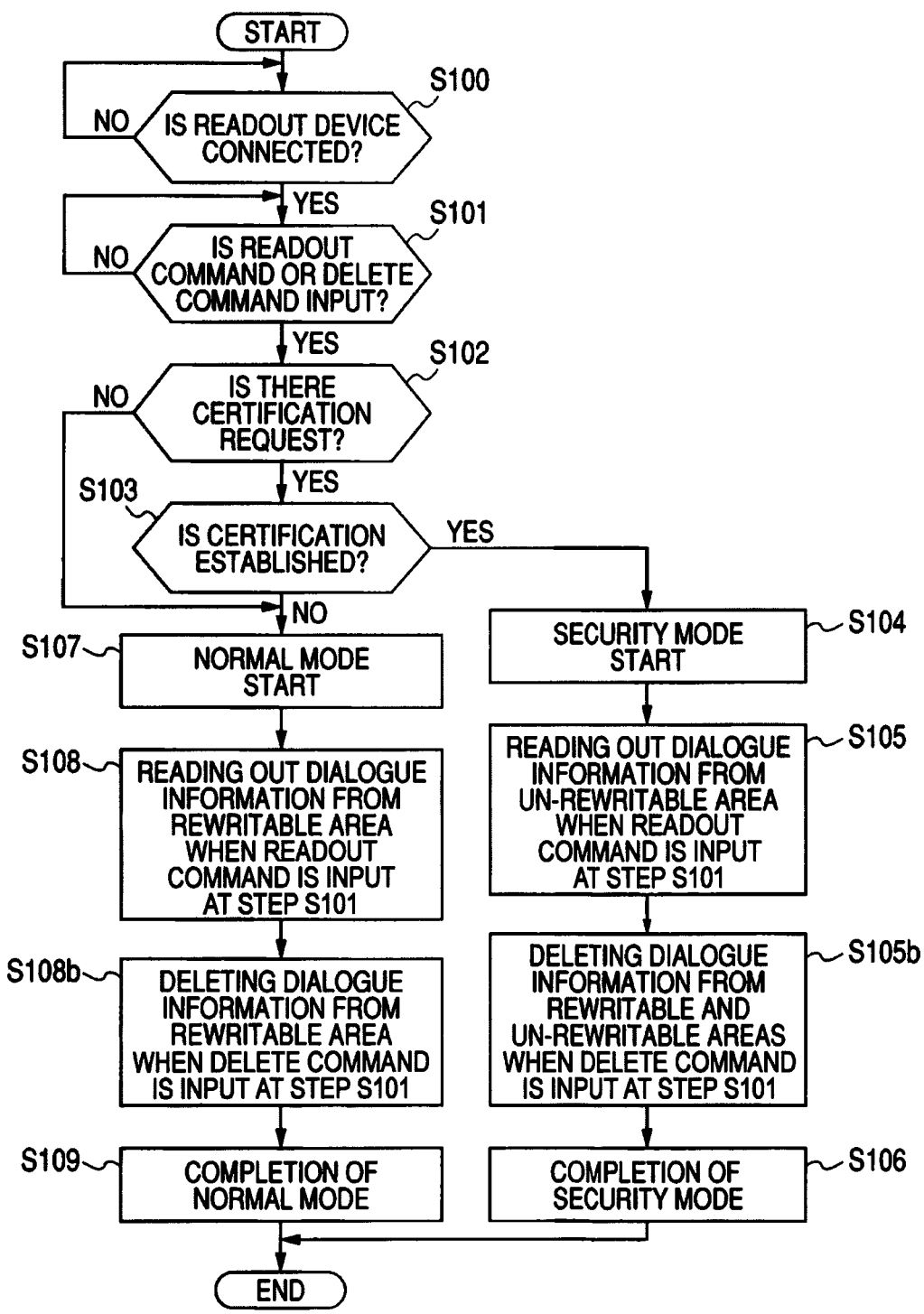
FIG. 3 is a flow chart showing operation procedure for reading out the dialogue information stored in the nonvolatile memory which is built in the vehicle control device in the memory readout system shown in FIG. 1.

FIG. 3 is a flow chart showing operation procedure for reading out the dialogue information stored in the nonvolatile memory 110 which is built in the vehicle control device 100 in the memory readout system shown in FIG. 1.

The dialogue information readout unit 130 judges whether or not the readout device 200 is connected to the vehicle control device 100 through the I/O interface 136 (step S100). When the judgment result indicates that the vehicle control device 100 is not connected to the readout device 200, the dialogue information readout unit 130 continuously performs this judgment until the judgment result indicates occurrence of the connection between the vehicle control device 100 and the readout device 200.

When the judgment result indicates that the vehicle control device 100 is connected to the readout device 200 in step S100, the dialogue information readout unit 130 further judges whether or not the readout device 200 outputs one of the readout command and the deletion command (step S101). The dialogue information readout unit 130 continues this judgment until the reception of one of those commands, such as the readout command and the deletion command, transferred from the readout device 200.

When the readout device 200 transfers the "readout command" to the vehicle control device 100, which is generated on pushing "Readout key" on the operation unit 230 in the readout device 200, the dialogue information readout unit 130 takes the judgment "YES", and the operation flow goes to step S102.

Next, the recognition processing unit 132 judges whether or not there is a certification request (step S102). When the judgment result indicates that the certification request occurs, the operation flow goes to step S103.

At step S103, the recognition processing unit 132 judges whether or not an input password is correct or not (step S103).

For example, when a predetermined password for user certification is determined in advance, and the input password is agreed with the predetermined password, the operation flow goes from step S103 to step S104. That is, the dialogue information readout unit 130 enters a security operation mode (step S104). The security operation mode is a mode to allow the readout device 200 to perform readout and deletion for the dialogue information stored in the un-rewritable area 114 in the nonvolatile memory 110 only when the certification is successful in step S103.

Next, the dialogue information readout unit 130 reads out the dialogue information B stored in the un-rewritable area 114 (step S105), and transfers the dialogue information B to the readout device 200 through the communication processing unit 134. After completion of the dialogue information transmission, the security operation mode is completed. The series of operations for reading out the dialogue information B stored in the un-rewritable area 114 is thereby completed.

On the other hand, when the certification in step S103 is a failure, namely a wrong password is input, or when there is no certification request using a password and the judgment result in step S102 indicates "NO", the operation flow goes to step S107 and the dialogue information readout unit 130 performs a normal operation mode.

The normal operation mode is a mode where the dialogue information readout unit 130 reads out or deletes the dialogue information A stored in the rewritable area 112 in the nonvolatile memory 110 when the certification is failed or there is no certification request.

Next, the dialogue information readout unit 130 reads out the dialogue information A stored in the rewritable area 112 in the nonvolatile memory 110 (step S108), and transfers the dialogue information A to the readout device 200 through the communication processing unit 134.

After completion of the dialogue information transmission, the normal operation mode is thereby completed. The series of operations for reading out the dialogue information is thereby completed.

A description will now be given of the operation of the memory readout system when the readout device 200 transfers the "deletion command" to the vehicle control device 100, which is generated on pushing the "Delete key" on the operation unit 230 in the readout device 200.

After the certification is performed, when the judgment result in step S103 indicates that the certification is a success, the operation flow goes to step S104 where the dialogue information writing unit 124 enters the security operation mode (step S104).

Next, the dialogue information writing unit 124 deletes both the dialogue information A stored in the rewritable area 112 and the dialogue information B stored in the un-rewritable area 114 in the nonvolatile memory 110 (step S105b), the dialogue information writing unit 124 transfers a completion command to the readout device 200 through the communication processing unit 134.

After completion of the transmission, the security operation mode is completed and the series of operations for deleting the dialogue information stored in the rewritable area 112 and the un-rewritable area 114 is thereby completed.

When the judgment result in step S103 indicates that the certification is a failure (for example, in case of inputting a wrong password), or when there is no certification request using a password and the judgment result in step S102 indicates "NO", the operation flow goes to step S107 and the dialogue information readout unit 130 performs the normal operation mode.

Next, the dialogue information writing unit 124 deletes the dialogue information A stored in the rewritable area 112 in the nonvolatile memory 110 (step S108b), and then transfers the deletion completion command to the readout device 200 through the communication processing unit 134.

The flow chart in FIG. 3 shows both of step S105 and step 105b. The operation in step S105 is performed corresponding to the readout command transferred from the readout device 200 and the operation in step S105b is performed corresponding to the deletion command transferred from the readout device 200.

Similarly, the flow chart in FIG. 3 shows both of step S108 and step 108b. The operation in step S108 is performed corresponding to the readout command transferred from the readout device 200 and the operation in step S108b is performed corresponding to the deletion command transferred from the readout device 200.

According to the memory readout system described above, because the vehicle information is written into the un-rewritable area 114 in the nonvolatile memory 110, it is possible to prevent occurrence of the dialogue information (as vehicle information) deletion by carelessness or unexpected deletion. In addition, because the dialogue information as the vehicle information stored in the rewritable area 112 in the nonvolatile memory 110 can be deleted, the dialogue information transferred from an actual vehicle is re-written into the rewritable area 112 after completion of the dialogue information deletion, it is possible to easily recognize whether the failure state corresponding to the dialogue information has recurred or not.

Still further, because the dialogue information can be read out from either the rewritable area 112 or the un-rewritable area 114 in the nonvolatile memory 110 based on the certification result in step S103, it is possible to read out the correct dialogue information without the occurrence of deletion and overwriting only when the formal readout device 200 is used and the formal password is used. Therefore even if an operator has not the formal readout device 200 (For example, an operator in a vehicle repair shop does not know the formal password), the operator can readout the dialogue information stored in the rewritable area 112 in the nonvolatile memory 110 without much labor and increment of cost.

Still further, because the security operation mode is completed after completion of the readout operation following the certification step performed every reading of the dialogue information by connecting the readout device 200 to the vehicle control device 100, it is possible to avoid a special or additional step of releasing the vehicle control device 100 from the security operation mode in which the dialogue information is read out from the un-rewritable area 114 which is performed after completion of the certification.

Still further, the predetermined operation allows an operator to input the formal password during the certification step.

This means that only a special operator can input the formal password into the vehicle control device 100, where the special operator knows that it is possible to read out the dialogue information stored in the un-rewritable area 114 only after completion of the certification step. Accordingly, operators other than the special operator cannot know how to read out the dialogue information stored in the un-rewritable area 114 in the non-volatile memory 110 in the vehicle control device 100.

The concept of the present invention is not limited by the embodiment described above. It is possible to apply the concept of the present invention to various modifications within the scope of the present invention. For example, the dialogue information writing unit 124 writes the dialogue information generated by the dialogue information generation unit 122 into the nonvolatile memory 110, it is acceptable to add other information to the dialogue information to be written into the nonvolatile memory 110.

(First Modification)

Figure 4:
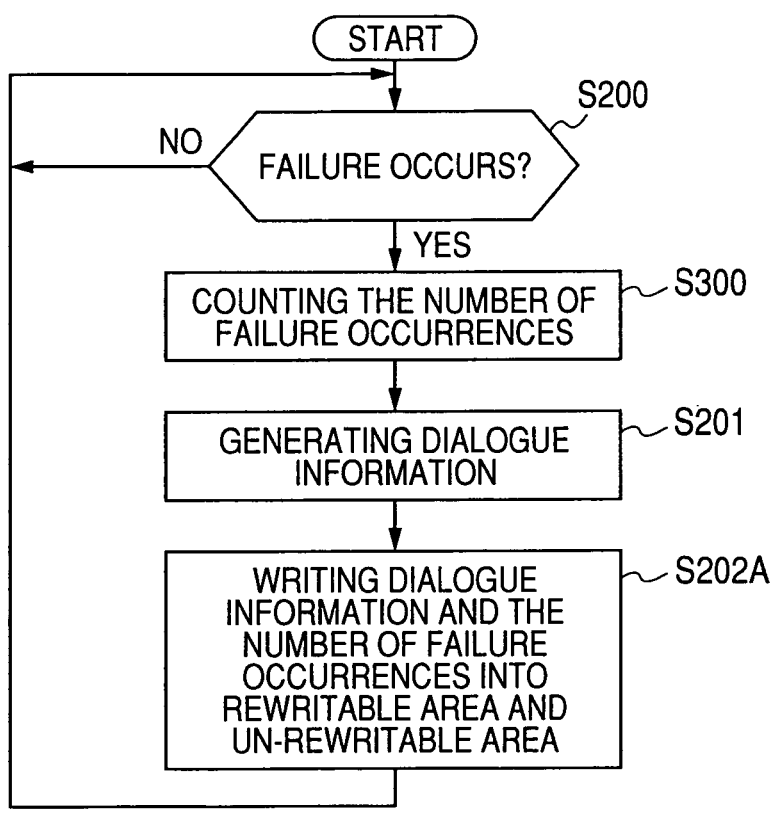
FIG. 4 is a flow chart showing a modification example of the operation procedure for generating and writing the dialogue information into the nonvolatile memory which is built in the vehicle control device in the memory readout system shown in FIG. 1.

FIG. 4 is a flow chart showing a modified example of the operation procedure for generating and writing the dialogue information into the nonvolatile memory 110 which is built in the vehicle control device 100 in the memory readout system shown in FIG. 1.

The flow chart FIG. 4 has additional step S300 and replaced step S202A when compared with the flow chart shown in FIG. 2. That is, step S202A is replaced with step S202 in the flowchart shown in FIG. 2.

A description will now be given of the difference steps S300 and S202A with reference to FIG. 4.

On detecting a failure occurrence, the judgment result in step S200 provides "YES", the operation flow thereby goes to step S300, and the counter 126 is incremented by the number of the occurrences of failure (step S300).

The dialogue information writing unit 124 writes as the dialogue information A both of the dialogue information generated by the dialogue information generation unit 122 and the number of failure occurrences into the rewritable area 112 in the nonvolatile memory 110, and further writes those as the dialogue information B into the un-rewritable area 114 in the nonvolatile memory 110 (step S202A).

It is thereby possible to obtain the number of failure occurrences when the dialogue information is read out from the nonvolatile memory 110, and to easily analyze the failure cause based on the dialogue information including the number of failure occurrences. It is also possible to write the number of failure occurrences only into the un-rewritable area 114.

(Second Modification)

FIG. 5 is a flow chart showing another modification example of the operation procedure for generating and writing the dialogue information into the nonvolatile memory 110 which is built in the vehicle control device 100 in the memory readout system shown in FIG. 1.

The flow chart FIG. 5 has the additional step S301 and additional step S202B when compared with the flow chart shown in FIG. 2. A description will now be mainly given of the additional step S301 and S202B with reference to FIG. 5.

After generating the dialogue information (step S201), the dialogue information generation unit 122 (or the dialogue information writing unit 124) judges whether or not a plurality of failures occurs simultaneously (step S301). When the judgment result indicates there are no simultaneous failure occurrences, the operation flow goes to step S202.

In step S202, the dialogue information writing unit 124 writes the dialogue information generated by the dialogue information generation unit 122 into the rewritable area 112 in the nonvolatile memory 110 as the dialogue information A, and also writes it as the dialogue information B into the un-rewritable area 114 in the nonvolatile memory 110.

On the other hand, when the judgment result in step S301 indicates that a plurality of failures occurs simultaneously, the operation flow goes to step S202B. In step S202B, the dialogue information writing unit 124 writes the dialogue information generated by the dialogue information generation unit 122 and simultaneous occurrence information regarding simultaneous occurrence failures (representing which failures simultaneously occur) into the rewritable area 112 in the nonvolatile memory 110 as the dialogue information A, and also writes them as the dialogue information B into the un-rewritable area 114 in the nonvolatile memory 110.

The dialogue information including the simultaneous occurrence information enables an operator to know a combination of failures which simultaneously occur. It is also possible to write the simultaneous occurrence information only into the un-rewritable area 114 in the nonvolatile memory 110.

It is acceptable to add vehicle condition information (indicating that a vehicle is in one of an acceleration state, a deceleration state, and idle state) at a failure occurrence into the dialogue information generated by the dialogue information generation unit 122. Knowing the vehicle condition at the failure occurrence enables an operator to easily know and analyze a failure cause based on the dialogue information read out from the nonvolatile memory 110.

Still further, it is possible to add control state information stored in registers when a failure occurs into the dialogue information to be written into the nonvolatile memory 110. Because this enables an operator to know the control state of the vehicle control device 100 at the failure occurrence, it is possible to easily know and analyze a failure cause based on the dialogue information read out from the nonvolatile memory 110.

Still further, it is possible to add electric power source state information indicating an electric power source state into the dialogue information generated by the dialogue information generation unit 122. Because an operator can know the electric power source condition (for example, whether or not an ignition key is ON or OFF at the failure occurrence) based on the electric power source state information, it is possible to easily know and analyze a failure cause based on the dialogue information read out from the nonvolatile memory 110.

In the embodiment and modifications described above, although the recognition processing unit 132 performs the password certification when receiving the password transferred from the readout device 200, it is possible to perform the password certification using another method, for example, using a special data item (such as a manufacture serial number) stored in a formal readout device 200.

It is possible for the recognition processing unit 132 to perform the password certification only when a special condition occurs, although such a situation is through of as highly unlikely in an actual vehicle. For example, the vehicle control device 100 has a configuration to input a vehicle speed signal transferred from a vehicle speed sensor through the I/O interface 136, and performs the password certification only when the vehicle speed signal indicates not less than 300 km/hour.

It is thereby possible to perform the password certification only when a special device generating such a special condition is connected to the vehicle control device 100. This can prevent the password certification operation by unauthorized person who does not know such a special condition or does not have such a special device. It is also possible to use another condition other than the vehicle speed as the special condition.

Still further, in the embodiment and modifications described above, the operation mode is switched to the security operation mode only after performing the password certification every reading of the dialogue information, and then returned to the normal operation mode. However, the present invention is not limited by the above method. For example, after the operation mode is switched to the security operation mode by performing the initial password certification, it is acceptable to continue the security operation mode even if each readout operation of the dialogue information is completed. In this case, the security operation mode is terminated only when an ignition key of a vehicle is OFF or the readout device 200 is detached from the vehicle control device 100. This can switch the security operation mode to the normal operation mode without performing special operation.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A memory readout system comprising a vehicle control device and a readout device which is detachably connected to the vehicle control device, the vehicle control device comprising:

a non-volatile memory that has at least a rewritable area configured to allow data writing and data deletion and an un-rewritable area configured to allow data writing and configured to inhibit data deletion;

a vehicle information write apparatus configured to generate vehicle information and to write the vehicle information into the rewritable area and into the un-rewritable area;

a vehicle information readout apparatus configured to read out the vehicle information stored in the un-rewritable area and configured to transfer the vehicle information to the readout device when the readout device is connected to the vehicle control device; and a certification apparatus configured to perform a predetermined certification of whether or not the readout device is an authorized device or whether or not an operator using the readout device is an authorized operator, wherein the vehicle information readout apparatus is configured to read out the vehicle information stored in the un-rewritable area when the certification apparatus judges that the readout device is an authorized device or the operator using the readout device is an authorized operator, wherein the vehicle information readout apparatus is configured to read out the vehicle information stored in the rewritable area when the certification apparatus judges that the readout device is not an authorized device or that the operator using the readout device is not an authorized operator, and wherein the certification apparatus executes the certification when the vehicle control device detects an occurrence of a special condition.

2. The memory readout system according to claim 1, wherein the vehicle information is failure information which is collected or generated when a failure occurs, the vehicle control device further comprises a counter apparatus configured to count the number of failure occurrences, and the vehicle information write apparatus is configured to add the number of failure occurrences counted by the counter apparatus into the vehicle information to be written into the un-rewritable area.

3. The memory readout system according to claim 1, wherein the vehicle information is failure information that is collected or generated when a failure occurs in a vehicle, and the vehicle information write apparatus is configured to add simultaneous information into the vehicle information, the simultaneous information distinguishing each of failures which simultaneously occur from other failures.

4. The memory readout system according to claim 1, wherein the vehicle information is failure information that is collected or generated when a failure occurs in a vehicle, and the vehicle information write apparatus is configured to add vehicle state information into the vehicle information, the vehicle state information representing a vehicle state at the failure occurrence.

5. The memory readout system according to claim 4, wherein the vehicle state information includes control state information which represents a control state obtained by the vehicle control device.

6. The memory readout system according to claim 4, wherein the vehicle state information includes electric power source state information which represents an electric power source condition at the failure occurrence.

7. The memory readout system according to claim 1, wherein the certification apparatus is configured to execute the certification for every reading of the vehicle information by the vehicle information readout apparatus.

8. The memory readout system according to claim 7, wherein the readout device comprises a password input apparatus configured to allow the operator to input a password in response to the operator performing a predetermined operation, and the certification apparatus is configured to execute the certification of the password which is input through the password input apparatus.

9. The memory readout system according to claim 1, wherein a readable state, in which the vehicle information stored in the un-rewritable area is readable, is configured to be initiated in response to the authorization of the certification apparatus and is configured to be terminated in response to a vehicle ignition being in an off position.

10. The memory readout system according to claim 1, wherein
a readable state, in which the vehicle information stored in the un-rewritable area is readable, is configured to be initiated in response to the authorization of the certification apparatus and is configured to be terminated in response to the readout device being detached from the vehicle control device.

11. The memory readout system according to claim 1, wherein the special condition is established in response to detecting that a vehicle speed signal of not less than a predetermined vehicle speed is transferred from the vehicle.

* * * * *